United States Patent

Suzuki et al.

Patent Number: 5,648,133
Date of Patent: Jul. 15, 1997

[54] BIAXIALLY ORIENTED CRYSTALLINE RESIN CONTAINER AND PROCESS OF MAKING THE SAME

[75] Inventors: Saburo Suzuki; Hiroyuki Orimoto, both of Ueda; Fumiya Amari, Komoro, all of Japan

[73] Assignee: Nissei ASB Machine Co., Ltd., Nagano-ken, Japan

[21] Appl. No.: 767,483

[22] Filed: Sep. 30, 1991

[30] Foreign Application Priority Data

Oct. 5, 1990 [JP] Japan ................ 2-268654

[51] Int. Cl.$^6$ ................ B29D 22/00
[52] U.S. Cl. ............ 428/36.92; 428/35.7; 428/36.6; 215/370
[58] Field of Search ............ 428/35.7, 36.92, 428/36.6; 215/1 C

[56] References Cited

U.S. PATENT DOCUMENTS

| | | | |
|---|---|---|---|
| 3,468,443 | 9/1969 | Marcus | 215/1 C |
| 3,870,181 | 3/1975 | Sincock | 215/1 C |
| 4,174,782 | 11/1979 | Obsomer | 215/1 C |
| 4,379,099 | 4/1983 | Ota et al. | 264/25 |
| 4,463,121 | 7/1984 | Gartland et al. | 524/219 |
| 4,497,855 | 2/1985 | Agrawal et al. | 428/36.92 |
| 4,525,401 | 6/1985 | Pocock et al. | 428/64 |
| 4,755,404 | 7/1988 | Collette | 428/35 |
| 4,889,752 | 12/1989 | Beck | 428/36.92 |
| 4,892,205 | 1/1990 | Powers et al. | 428/36.92 |
| 4,997,692 | 3/1991 | Yoshino | 428/36.92 |
| 5,066,528 | 11/1991 | Krishnakumar et al. | 428/36.92 |
| 5,067,622 | 11/1991 | Garver et al. | 215/1 C |
| 5,104,706 | 4/1992 | Krishnakumar et al. | 428/36.92 |

FOREIGN PATENT DOCUMENTS

| | | |
|---|---|---|
| 53-108174 | 9/1978 | Japan . |
| 57-57330 | 12/1982 | Japan . |
| 60-172636 | 9/1985 | Japan . |
| 62-146137 | 6/1987 | Japan . |

*Primary Examiner*—Samuel A. Acquah
*Assistant Examiner*—Michael A. Williamson
*Attorney, Agent, or Firm*—Oliff & Berridge

[57] ABSTRACT

A resin container has a bottom structure which has a central recessed portion containing substantially no crystal, a marginal raised portion crystallized by molecular orientation, and an intermediate ring-shaped portion crystallized to have spherulite-like crystals.

The bottom structure highly improves the heat-resistance at the intermediate portion, while maintaining the central recessed portion at a good impact-resistance.

5 Claims, 3 Drawing Sheets

BIAXIALLY ORIENTED CRYSTALLINE RESIN CONTAINER AND PROCESS OF MAKING THE SAME

BACKGROUND OF THE INVENTION

1. Field of the Invention

The present invention relates to a container of biaxially oriented crystalline resin, particularly, having an improved bottom portion, and a process of making the same.

2. Description of the Related Art

Containers made of biaxially oriented crystalline resins such as polyethylene terephthalate (PET) have many advantages in gas-barrier property, transparency, toughness, hygiene and others.

It is normally required that the containers of PET are formed to resist an impact and a rapid increase of internal pressure due to such an impact when they are dropped onto a hard surface from at least a substantial height under such a condition that the containers are filled with liquid and capped. The containers of PET are frequently formed to have one of the most conventional bottom structures taken in glass bottles, that is, a bottom structure similar to that of a champagne bottle. The external surface of such a bottom structure generally includes a central recessed portion and a marginal raised portion surrounding the central recessed portion and gradually extending outwardly and axially from the central recessed portion, the marginal raised portion transiting to the lower end of the side wall of the container. The lowermost portion of the marginal raised portion is entirely in a planer plane such that the container can stand upright on the horizontal plane.

When a container having its bottom similar to that or the champagne bottle is to be formed of biaxially oriented PET, the bottom of such a container may have a wide portion which has not been molecular oriented. Such a not-oriented bottom portion is poor in heat-resistance. If the container is filled with a high temperature liquid, therefore, the central recessed portion of the bottom thereof will be deformed outwardly, resulting in loss of the self-supporting property.

Many proposals have been made which improve the heat-resistance in the bottoms of PET bottles used to charge liquid at raised temperatures. Some of such proposals are disclosed, for example, in Japanese Patent Laid-Open Nos. Sh. 62-146137, Sho 53-108174 and Sho 60-172636, Japanese Patent Publication No. Sho 57-57330, and U.S. Pat. No. 3,468,443. Particularly, Japanese Patent Laid-Open No. Sho 62-146137 discloses a technique of arranging a plurality of radial ribs on the bottom portion of a container to promote the orientation and crystallization in the bottom portion for improving the heat-resistance.

The complicated arrangement of the ribs on the bottom of the PET container degrades the appearance of the container itself and also requires a very expensive blow mold having a cavity of complicated configuration.

A technique other than the above techniques also is known which is to improve the heat-resistance in the aforementioned type of PET containers by crystallizing all the bottom portion of a PET container into spherulite-like crystals. However, such a technique certainly improves the heat-resistance in the PET containers, but raises another problem in that a PET container produced according to this technique tends to crack at a position adjacent to the gate of the central bottom portion when it is dropped onto the hard surface.

In order to provide spherulite-like crystals over all the bottom of the PET container, the latter must be heated such that the central thick-walled bottom portion having a higher heat capacity will be heated up to a temperature higher than a predetermined temperature of crystallization. Such a heating process requires a prolonged time, resulting in very reduction of the producibility.

SUMMARY OF THE INVENTION

It is therefore an object of the present invention to provide a biaxially oriented crystalline resin container having a bottom structure superior to the prior art in heat-resistance and high-impact properties and also to provide a process of making the same.

To this end the present invention provides a biaxially oriented crystalline resin container comprising a sleeve-shaped side wall and a bottom portion formed on the side wall at one end, said bottom portion including a central recessed portion having substantially no crystal, an intermediate ring-shaped crystallized portion formed along the outer periphery of the central recessed portion and a marginal raised portion formed on the outer periphery of said intermediate portion to transit therefrom to the side wall, said marginal raised portion crystallized by molecular orientation.

The present invention also provides a process of making the biaxially oriented crystalline resin container said process comprising the steps of:

(a) blow molding a primary blow-molded product which is a parison of a crystalline resin having a bottom, said bottom including a central thick-walled and recessed portion having substantially no molecular oriented crystal, an intermediate ring-shaped portion formed around the outer periphery of said central recessed portion and having a wall thickness smaller than that of said central recessed portion, said intermediate portion having substantially no molecular oriented crystal and a marginal raised portion formed around the outer periphery of said intermediate portion to transit therefrom to the side wall of the container, said marginal raised portion having molecular oriented crystals;

(b) heating the intermediate portion of said primary blow-molded product under such a condition that temperature and time are established for crystallization; and (c) further blow molding said primary blow-molded product after said heating step to form a secondary blow-molded product which is a biaxially oriented crystalline resin container including a bottom, said bottom of said biaxially oriented crystalline resin container having a central recessed portion having substantially no crystal, an intermediate ring-shaped crystallized portion formed around the central recessed portion and a marginal raised portion formed along the outer periphery of said intermediate portion and transiting therefrom to the side wall of said container said marginal raised portion of said biaxially oriented crystalline resin container having molecular oriented crystals.

The present invention further provides a process of making a biaxially oriented crystalline resin container, comprising the steps of:

(a) forming a parison of a crystalline resin and heating a portion of said parison corresponding to the intermediate portion of a bottom after blow molded under such a condition of temperature and time that said parison portion can be previously crystallized, and (b) blow molding said parison into a biaxially oriented crystalline resin container having a bottom, said bottom including a central recessed portion having substantially no crystal, an intermediate ring-shaped crystallized portion formed around said central recessed portion and a marginal raised portion formed around the outer periphery of said intermediate portion and transiting therefrom to the side wall of said container, said marginal raised portion having molecular oriented crystals.

The crystallization of the intermediate ring-shaped portion used herein mainly means that it forms spherulite-like crystals. However, the present invention is not limited to the formation of spherulite-like crystals and may be applied to any other manner of crystallization if it can provide an improvement of heat-resistance from the crystallization.

Thus, the container of the present invention has an improved heat-resistance by providing a bottom structure which includes an intermediate ring-shaped portion having spherulite-like crystals, the intermediate portion being located between a central recessed portion having substantially no crystals and a marginal raised portion having molecular oriented crystals.

Since the central recessed portion of the bottom adjacent to the gate has no crystal, thus, it can have a high-impact property as high as creating no cracks therein even if the container is dropped onto any hard surface.

It is preferred that prior to the blow molding step, the parison has the intermediate portion having a thickness smaller than that of the central recessed portion but larger than that of the marginal raised portion, thereby providing the heat capacity of the intermediate portion lower than that of the central recessed portion. This serves to provide a great reduction of time required to heat the intermediate portion up to a temperature equal to or higher than the temperature of crystallization, resulting in improvement of the producibility of crystalline resin containers.

BRIEF DESCRIPTION OF THE DRAWINGS

FIG. 1 A is a fragmentary cross-section of the primary blow-molded product and FIG. 1 B is a fragmentary cross-section of the secondary blow-molded product which is a final product.

FIG. 2 A is a fragmentary cross-section of the primary blow-molded product and

FIG. 2 B is a fragmentary cross-section of the secondary blow-molded product which is a final product.

FIG. 3 A is a fragmentary cross-section of the primary blow-molded product,

FIG. 3 B is a fragmentary cross-section of the secondary blow-molded product which is a final product and FIG. 3 C is a perspective view of the secondary blow-molded product shown in FIG. 3 B.

DETAILED DESCRIPTION OF THE PREFERRED EMBODIMENTS

The present invention will now be described in detail in connection with the preferred embodiments thereof which are illustrated in the accompanying drawings.

First Embodiment

Figure 1A:
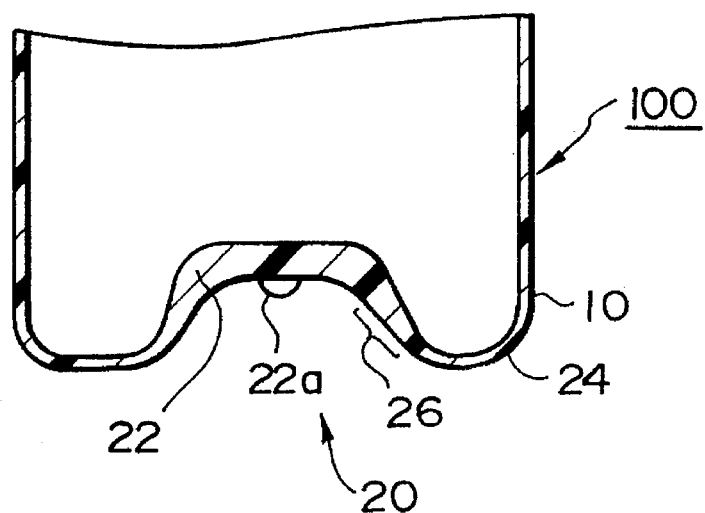
FIG. 1 is a schematic view of the first preferred embodiment a biaxially oriented crystal line resin container formed in accordance with the present invention.
Figure 1B:
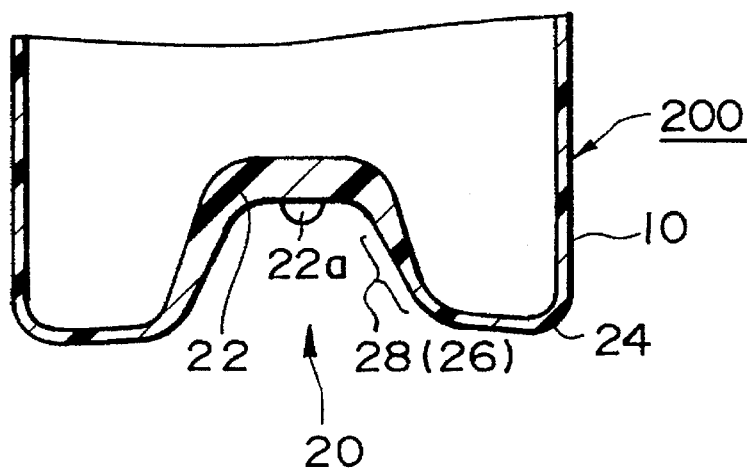

FIG. 1 shows one preferred example of the bottom portion of a biaxially oriented PET bottle to which the present invention is applied. FIG. 1 A shows a primary blow-molded product 100 formed from a PET parison by the use of a primary blow mold while FIG. 1 B shows a biaxially oriented PET container 200 formed as a final product from the primary blow-molded product by the use of a secondary blow mold.

As shown in FIG. 1 A, the primary blow-molded product 100 comprises a cylinder-shaped side wall 10 and a bottom portion 20 formed on the lower end of the side wall 10.

The bottom portion 20 includes a central recessed portion 22 having a relatively large thickness, a marginal raised portion 24 formed around the central recessed portion 22 and gradually transiting the central recessed portion 22 to the side wall 10, the marginal raised portion 24 having a relatively small thickness, and an intermediate ring-shaped portion 26 formed between the central recessed portion 22 and the marginal raised portion 24.

In the illustrated embodiment, the thickness of the bottom portion is gradually decreased from the central recessed portion 22 through the intermediate portion 26 to the marginal raised portion 24.

When the primary blow-molded product 100 is formed from the parison, the side wall 10 and the marginal raised portion 24 are sufficiently stretched and thinned to provide a molecular oriented structure which is improved in heat-resistance and mechanical strength.

On the other hand, the central recessed portion 22 of the bottom portion 20 located around the gate 22a will not be stretched and oriented, resulting in no molecular oriented crystal.

The intermediate portion 26 located between the central recessed portion 22 and the marginal raised portion 24 is slightly stretched and oriented, but will have molecules arranged in a very unstable state. Thus, the intermediate portion 26 becomes a thermally weakest region.

The feature of the present invention is that the central recessed portion 22 has no crystal and the intermediate portion 26 is permitted to have spherulite-like crystals to form a spherulite-like crystallized region 28 by which the bottom portion 20 can be improved in heat-resistance and high-impact properties, as shown in FIG. 1 B.

The biaxially oriented crystalline resin container may be produced from PET in accordance with the following process:

First of all, a parison of PET is biaxially blow molded, by the use of a primary blow mold, Into the primary blow-molded product 100 having the bottom portion 20 shown in FIG. 1 A.

At this time, as described, the side wall 10 and the marginal raised portion 24 of the primary blow-molded product 100 are sufficiently stretched and molecular oriented to be practically sufficient in heat-resistance and mechanical strength.

On the contrary, the central recessed portion 22 of the bottom portion 20 is substantially not crystallized while the intermediate portion 26 has the thermally weakest region in which moleculars are arranged in very unstable state.

Subsequently, the bottom portion 20 of the primary blow-molded product 100 shown in FIG. 1 A is heated under such a condition of temperature and time that the intermediate portion 26 of the bottom portion 20 will have spherulite-like crystals therein.

In general, the crystallization or PET into spherulite requires to meet two requirements: the first requirement is that PET has not been crystallized at that time. If the marginal raised portion 24 of the primary blow-molded product 100 has been crystallized by molecular orientation, it will not be re-crystallized by heating. The second requirement is that the region to be treated is heated to a temperature or normally to the temperature of crystallization and then gradually cooled. Only when these two requirements are satisfied, the PET can be crystallized into spherulite to provide a white-colored opaque material.

As described, the central recessed portion 22 of the bottom portion 20 has its heat capacity larger than that of the intermediate portion 26 of the same. In the heating step, therefore, the intermediate portion 26 can be heated to the temperature of crystallization for a time period shorter than in the central recessed portion 22. The condition of heating is not particularly restricted if the intermediate portion 26 can be crystallized as desired. More particularly, this condition of heating depends on the shape and size of a bottle to be molded, type of resin material, type of molding process, molding cycle, thickness of the intermediate portion in the primary blow-molded product and others. For example, the condition of heating may be set to provide a temperature ranged between 240 degrees C. and 260 degrees C. and a time period ranged between 60 seconds and 100 seconds for a primary blow-molded product of Grade J-125 PET material manufactured and delivered by MITSUI Company.

The grade J-125 PET material manufactured by Mitsui Company is formed of a pellet configuration, has an intrinsic viscosity of 0.77 dl/g and a melting point in the range of 255°–265° C. It includes less than 2 ppm of acetaldehyde, has a density of 1.4 g/cm³ and less than 0.4% of water.

The heating of the bottom portion 20 is terminated when the intermediate portion 26 of the bottom portion 20 has been heated at the temperature of crystallization for a given time period.

A final product, that is, the PET bottle 200 shown in FIG. 1 B is formed by blow molding the heated primary blow-molded product 100 with use of a secondary blow mold. At this time, the intermediate portion 26 of the primary blow-molded product 100 is gradually cooled to provide the region 28 containing spherulite-like crystals. On the other hand, the central recessed portion 22 having its larger thickness is cooled without being heated up to its temperature of crystallization. Thus, the central recessed portion 22 contains substantially no spherulite-like crystal.

In accordance with the present invention, the marginal raised portion 24 and the intermediate portion 26 which is most thermally unstable are crystallized to provide a bottom portion 20 having a heat-resistance sufficient in practice.

Furthermore, the thick-walled portion of the bottom 20 adjacent to the gate 22a, that is, the central recessed portion 22 will not substantially crystallized. This provides a drop impact resistance and a heat-resistance sufficient in practice.

In addition, the central recessed portion 22 which would require an increased time period to heat it up to the temperature of crystallization is not crystallized while the intermediate portion 26 located around the central recessed portion 22 and having a relatively small heat-resistance is crystallized. Thus, time required to crystallize the bottom portion 20 as desired can be greatly reduced. Consequently, the present invention can produce a PET container having a bottom portion improved in heat-resistance and drop impact resistance, without any reduction of the producibility in making biaxially oriented crystalline resin containers.

Second Embodiment

Figure 2A:
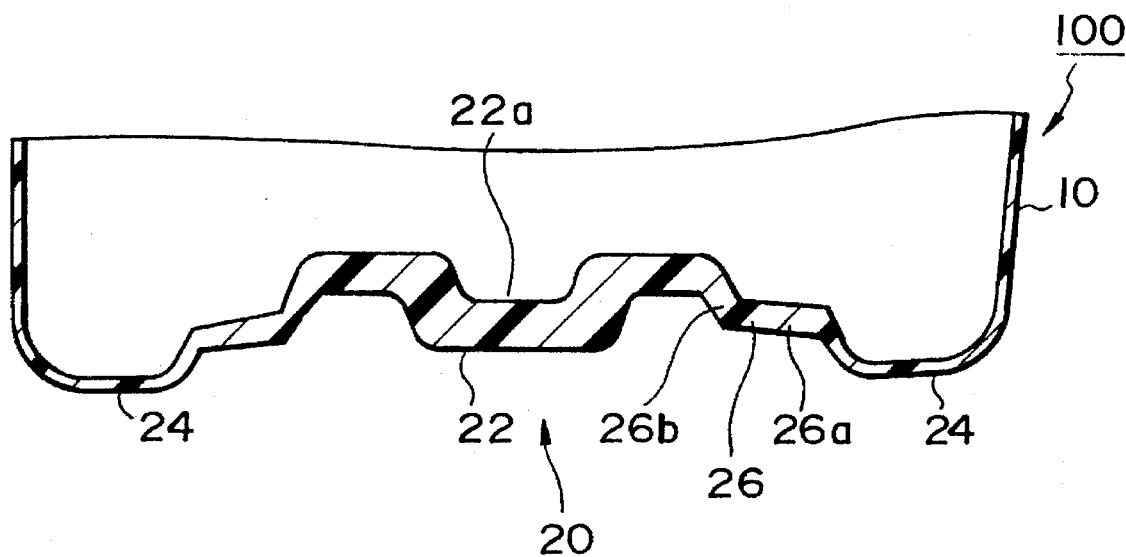
FIG. 2 is a schematic view of the second preferred embodiment of a biaxially oriented crystalline resin container formed in accordance with the present invention.
Figure 2B:
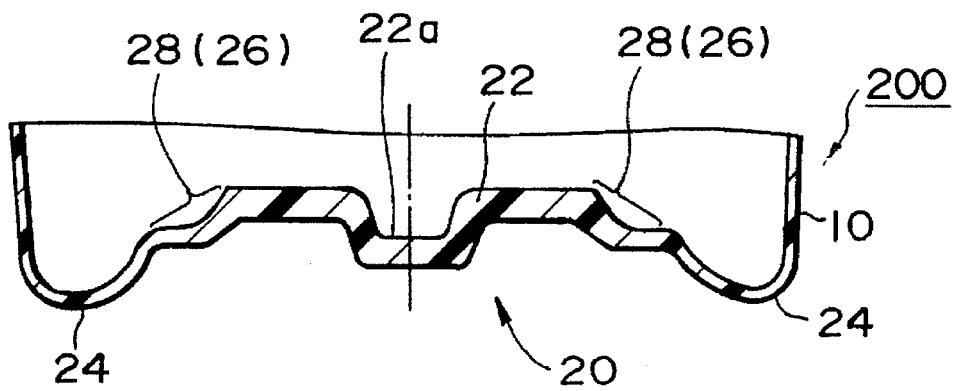

FIG. 2 illustrates the second preferred embodiment of a biaxially oriented crystalline resin container formed in according to the present invention.

Unlike the first embodiment in which the wall thickness in the bottom portion 20 of the primary blow-molded product 100 is gradually reduced from the central recessed portion 22 to the marginal raised portion 24, the second embodiment provides a primary blow-molded product 100 having a bottom portion 20 which includes a central recessed portion 22, a marginal raised portion 24 and an intermediate portion 26 formed between the central recessed portion 22 and the marginal raised portion 24 in a stepped configuration. The intermediate portion 26 has a thickness smaller than that of the central recessed portion 22 but larger than that of the marginal raised portion 24.

More particularly, the intermediate portion 26 of the second embodiment comprises a disc-like step portion 26a located around the central recessed portion 22, the step portion 26a having a substantially uniform thickness; and a connecting wall 26b connecting between the step portion 26a and the margin of the central recessed portion 22, the connecting wall 26b having a wall thickness equal to that of the step portion 26a.

The primary blow-molded product 100 thus formed is then heated and blow molded by the use or the second blow mold in the same manner as in the first embodiment. The resulting PET bottle 200 has the bottom portion 20 in which the intermediate portion 26 is formed to be a region containing spherulite-like crystals, as shown in FIG. 2 B.

In the second embodiment, regions to be crystallized into spherulite-like crystalline structure can be accurately pre-designed as regions 26a and 26b.

The second embodiment is also characterized in that the central recessed portion 22 includes a further recessed part 22a for receiving the end of rod means. When the further recessed part 22a receives the end of rod means such as a stretching rod used in the primary blow molding step or a centering rod used in the secondary blow molding step, the bottom can be prevented from being offset even if there is any heat shrinkage in PET.

Experimental Example

Data experimentally obtained when a biaxially oriented PET bottle was blow molded in accordance with the principle or the present invention will described below.

Figure 3A:
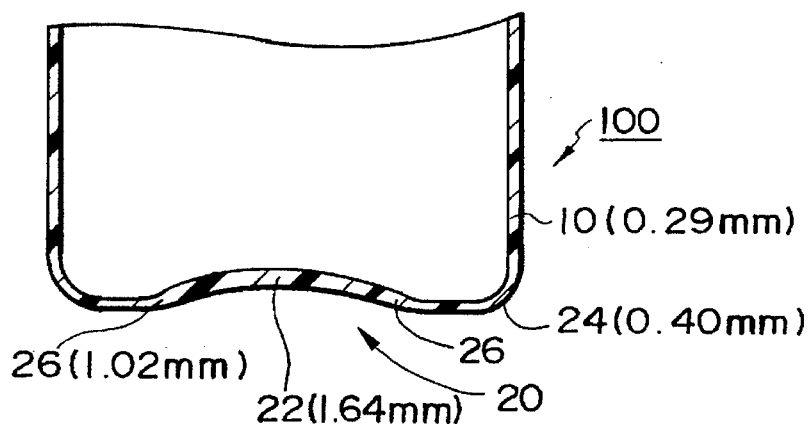
FIG. 3 is a schematic view of a PET container experimentally formed.
Figure 3B:
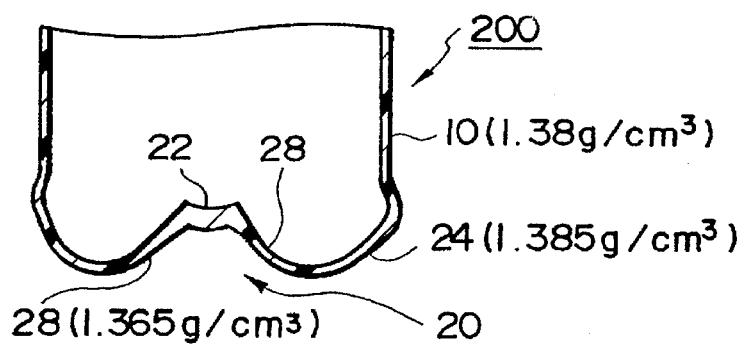
Figure 3C:
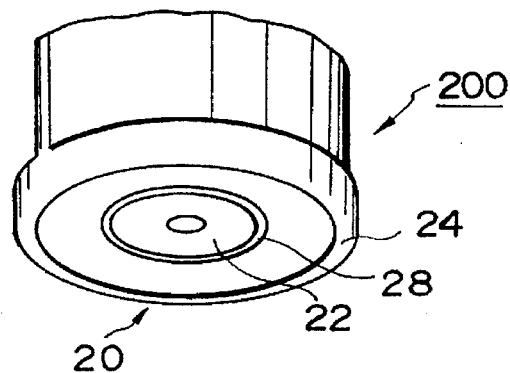

A parison of PET was blow molded into a primary blow-molded product 100 shown in FIG. 3 A. The primary blow-molded product 100 had a side wall 10 having a wall thickness equal to 0.29 mm, a marginal raised portion 24 having a thickness equal to 0.40 mm, an intermediate portion 26 having a thickness equal to 1.02 mm and a central recessed portion 22 having a thickness equal to 1.64 mm.

The primary blow-molded product 100 was then heated and shrunk in an oven for one minute. The heated primary blow-molded product 100 is subjected to a secondary blow molding step wherein a PET bottle 200 is formed as a final product shown in FIG. 3 B. FIG. 3 C is a perspective bottom view showing the bottom portion 20 of the PET bottle 200.

The PET bottle 200 thus formed had a side wall having a density equal to 1.38 g/cm3, a marginal raised portion 24 having a density equal to 1.385 g/cm3, and an intermediate portion 28 having a density equal to 1.365 g/cm3. and yet, it was found that the intermediate portion 28 became a white-colored opaque ring containing spherulite-like crystals, as shown in FIG. 3 C.

It was thus recognized that the present invention can produce a PET bottle 200 having a bottom portion 20 which comprises a central recessed portion 22 having substantially no crystal, an intermediate portion 26 located around the central recessed portion 22 and crystallized to have spherulite-like crystals and a marginal raised portion 24 located around the intermediate portion 26 and molecular oriented to have crystals.

It is to be understood that the present invention is not limited to the aforementioned embodiments and may be carried out with many modifications and changes without departing the scope of the invention.

Although the embodiments have been described as to the PET containers produced through the primary blow molding step, the heating step and the secondary blow molding step in the order as described, the present invention may be applied such that only the intermediate portion 26 of the primary blow-molded product is partially heated by any suitable heating means to provide spherulite-like crystals in this region.

In addition, the present invention may be used to provide PET containers each having a similar bottom portion by blow molding a parison having a region corresponding to the intermediate portion 28 of the final bottom portion 20, which region contains spherulite-like crystals.

More particularly, the marginal bottom region of the parison transiting from the central bottom portion to the side wall, which is supposed to be the intermediate region in the bottom portion of a final product (transition from the stretched part to the non-stretched part), is locally heated by any suitable heating means up to the temperature of crystallization. Thereafter, the parison may be blow molded into a primary blow-molded product.

Although the embodiments have been described as to PET containers, the present invention may be applied to any other suitable crystalline materials such as polypropylene, vinylidene chloride, Nylon, polyvinylidene chloride, polyethylene, polyethylene naphthalate and so on.

As will be apparent from the foregoing, the present invention provides a biaxially oriented crystalline resin container having a bottom structure improved in heat-resistance and high-impact properties and a process of making the same with an improved producibility.

We claim:

1. A biaxially oriented crystalline resin container comprising a cylindrical side wall and a bottom portion formed on the lower end of said side wall, said bottom portion including:
    a central recessed portion containing substantially no crystal and having a first thickness;
    an intermediate crystallized portion formed with substantially spherulite crystals, said intermediate portion disposed around the outer periphery of said central recessed portion and having a second thickness thinner than said first thickness; and
    a marginal raised portion formed around the outer periphery of said intermediate portion to transit therefrom to said side wall, said marginal raised portion being crystallized by molecular orientation and having a third thickness thinner than said second thickness,
    wherein said central recessed portion extends inward and upward from its outer periphery.

2. A biaxially oriented crystalline resin container as defined in claim 1 wherein the crystalline resin used to form the container is polyethylene terephthalate.

3. A biaxially oriented crystalline resin container as defined in claim 1 wherein the crystalline resin used to form the container is selected from a group consisting of polypropylene, vinylidene chloride, Nylon, polyvinylidene chloride, polyethylene, and polyethylene naphthalate.

4. A biaxially oriented crystalline resin container as defined in claim 1, wherein thickness between said central recessed portion, said intermediate portion and said marginal raised portion varies continuously.

5. A biaxially oriented crystalline resin container as defined in claim 1, wherein thickness between said central recessed portion, said intermediate portion and said marginal raised portion varies in predetermined step increments.

* * * * *